(12) United States Patent
Naaman

(10) Patent No.: US 9,392,572 B2
(45) Date of Patent: Jul. 12, 2016

(54) USING LOCATION-BASED REQUEST DATA FOR IDENTIFYING BEACON LOCATIONS

(75) Inventor: Mor Naaman, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 1105 days.

(21) Appl. No.: 12/042,218

(22) Filed: Mar. 4, 2008

(65) Prior Publication Data

US 2009/0227270 A1    Sep. 10, 2009

(51) Int. Cl.
*H04W 74/00* (2009.01)
*H04W 64/00* (2009.01)
*H04W 4/02* (2009.01)
*H04W 88/08* (2009.01)

(52) U.S. Cl.
CPC .............. *H04W 64/003* (2013.01); *H04W 4/02* (2013.01); *H04W 88/08* (2013.01)

(58) Field of Classification Search
CPC ... H04W 64/00; H04W 48/14; H04W 64/003; H04W 4/02; H04W 88/08; H04M 2242/30
USPC ....................... 455/404.2, 414, 1–414.3, 440, 455/456.1–456.6, 457, 414.2, 456.5; 379/142.1
See application file for complete search history.

(56) References Cited

U.S. PATENT DOCUMENTS

| | | | | |
|---|---|---|---|---|
| 6,115,611 A | * | 9/2000 | Kimoto et al. | ............. 455/456.3 |
| 8,145,234 B1 | * | 3/2012 | Leonard | ................... G01S 19/05 455/456.1 |
| 2005/0108213 A1 | * | 5/2005 | Riise et al. | ......................... 707/3 |
| 2006/0025157 A1 | * | 2/2006 | Kuwahara et al. | ......... 455/456.1 |
| 2007/0232323 A1 | * | 10/2007 | Spriestersbach | ........... 455/456.1 |
| 2008/0248813 A1 | * | 10/2008 | Chatterjee | .................. 455/456.2 |

OTHER PUBLICATIONS

FAQ/ Location Tags in Flickr "What Are Cell Tags?" Zone Tag Photos, http://zonetag.research.yahoo.com/faq_location.php, accessed Jan. 14, 2008, 3 pages.

Ahern, Shane et al, "Reliable, User-Contributed GSM Cell-Tower Positioning Using Context-Aware Photos," Adjunct Proceedings of the Eighth International Conference on Ubiquitous Computing, 2006, 2 pages.

Google Maps, "Google Maps With My Location (beta)" htto.//ww-wgoogle.com/gmm/mylocation.html, 1 page, accessed on Jan. 14, 2008.

* cited by examiner

*Primary Examiner* — Thai Vu
(74) *Attorney, Agent, or Firm* — James J. DeCarlo; Greenberg Traurig LLP

(57) ABSTRACT

System and method are directed towards determining an approximate location of a cell tower (CT), using at least implicit location information obtained from a plurality of mobile devices obtained while each mobile device user employs a location based application. Also obtained are CT identifiers associated with a cell tower each mobile device is currently employing. When a sufficient number of mobile devices provide implicit location information for a given CT identifier, an approximate location may be determined. Subsequently, when a mobile device provides a CT identifier for which an approximate location has been determined, the approximate location information may be used to assist the user of the mobile device. For example, the user might access a location based application and automatically have an approximate location of the user's mobile device be provided to the application transparent to the user.

17 Claims, 5 Drawing Sheets

USING LOCATION-BASED REQUEST DATA FOR IDENTIFYING BEACON LOCATIONS

TECHNICAL FIELD

The present invention relates generally to enabling location based applications over a network and, more particularly, but not exclusively to determining an approximate cell tower location to identify an approximate mobile device location for use by location based applications.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries to obtain relevant search results. Irrelevant search results mean that the user is less likely to find when they are looking for, which in turn may translate into lost opportunities for merchants, or other businesses, to prosper from the user.

One approach then is to obtain the location of the user and use that information to refine their search queries. Unfortunately, obtaining the user's location often requires that the user's computing device provide such information. While an increasing number of computing devices are including such location based components as a global positioning system (GPS), not all computing devices have such capabilities. Moreover, even with GPS capability, such devices may be unable to provide location information within certain areas, such as within some buildings, or some other physically dense locations. Moreover, a single GPS device, or similar location detection component may not be calibrated, such that it may have a significant location error. Thus, for those users without such capability, or with a lesser quality capability, the user must explicitly enter location information into an application. This may be possible, when the user is actually aware of their current physical locations, but, where the user is in an unknown town, on an unknown street, or the like, this becomes more difficult. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
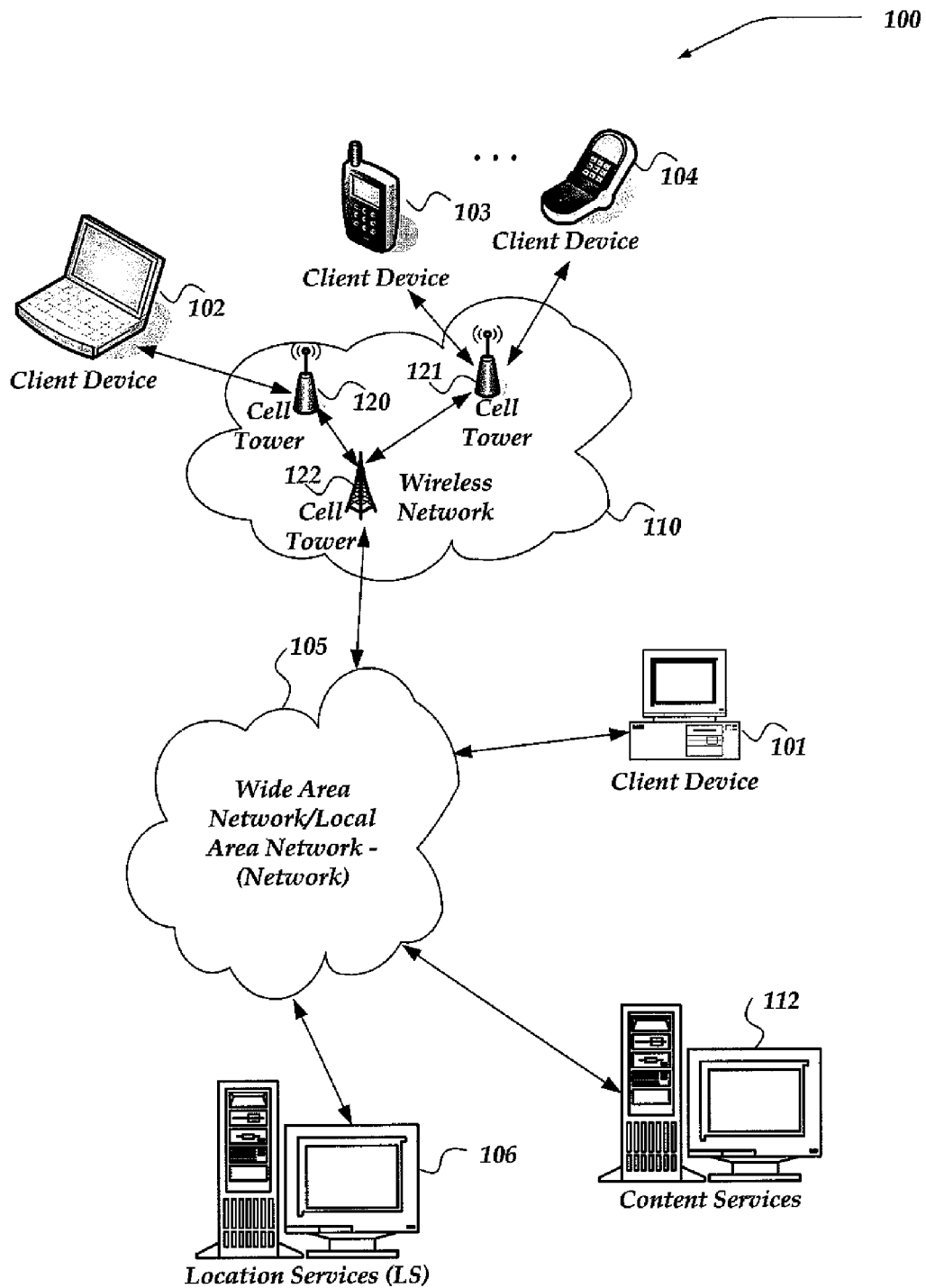
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, various embodiments are directed towards determining an approximate location or coverage area of a cell tower (CT), using information obtained from potentially a plurality of mobile devices. Such information may be obtained from implicit information obtained while each mobile device user employs a location based application. Such location based applications include, but are not limited to search applications, map applications, or the like. For example, a user might enter into a search application a request for "best pizza in Seattle," or "best pizza in Beacon Hill in Seattle." Such implicitly entered location information may be scraped or otherwise obtained from the user's input, and stored in a data store. Also obtained from each of the plurality of mobile devices is a CT identifier associated with a cell tower the mobile device is currently employing for communications. The CT identifier may also be stored along with the implicit location information. Then, when a sufficient number of location inputs have been provided for a given CT identifier, an approximate location may be determined. Such approximate location may represent an approximate location of the CT and further therefore, an approximate location of a mobile device connected to the CT. In one embodiment, the implicit location information might be examined to determine if a most popular or most often implicit location information has been received. If so, then such aggregated information may be used as the approximate location of the associated CT. In one embodiment, the location of the associated CT may result in identifying a general region or coverage area for the CT, rather than a specific latitude/longitude, street address, or the like. In any event, as more implicit location information is received, it may be used to refine the approximate location of the CT. By employing implicit location information from a plurality of mobile device it is anticipated that CT location can be more rapidly determined and provided to other mobile devices, as well as those providing at least some of the implicit location information. Thus, a user new to an area might be able to more quickly receive CT location information over more traditional approaches.

In one embodiment, the implicit location information may be complemented with other location information. For example, where a mobile device includes GPS or similar location based component, that location information may also be provided to the data store together with the CT identifier, to refine the approximate location of the CT. When a location based application specifically requests location information from a user, such explicit location information may further be used to also refine the approximate location of the CT (and through it, an approximate location of mobile device communicating with that CT).

When a mobile device provides a CT identifier for which an approximate location or coverage area has been determined, such location information may be used to assist the user of the mobile device. For example, the user of the mobile device might access a location based application and immediately have an approximate location of the user be provided to the application. For example, where the location based application is a map application, the approximate location of the CT might be used to display an approximate location of the user's mobile device on the map. However, use as the approximate location of the mobile device is not limited to map applications, and virtually any location based application might automatically receive, transparent to the user, the approximate location information.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, location services (LS) 106, mobile devices (client devices) 102-104, client device 101, and content services 112. Within wireless network 110 are also illustrated cell towers (CTs) 120-122.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to perform a search over a network. However, another application may also be used to perform a search over the network.

Moreover, mobile devices 102-104 may be configured to enable a user to access any of a variety of location based applications over the network. Such location based applications include virtually any application that is configured to employ location information to refine, enhance, or otherwise provide a result for display to the user. For example, one location based application might be a search application, where providing location information enables the search application to narrow or refine the search results. Typically, it may be expected that a user of the location based application provides location information about a current location that the mobile device is being employed. However, the location based application is not so constrained, and any location information may be provided. Another location based application might be a map application, where the user might enter location information. However, location based applications are not limited to these examples, and others also are envisaged.

In any event, the user might provide such location information during use of the location based application either explicitly or implicitly. Implicit location information as used herein refers to location information that a user might enter into an application that may be used to refine or restrict a result of an application and is not explicitly requested by the application. Thus, for example, where a user enters a search query for "That restaurants in Capital Hill Seattle," the implicit location information includes "Capital Hill Seattle." In this example, the search location based application did not explicitly request the location information. However, search location based applications may be configured to explicitly request location information. For example, in one embodiment, the search application might receive a search for "That restaurants," and respond by requesting the user to enter a location. However, in another embodiment, implicit location information may also be obtained when the user moves a display cursor over a particular identified location within the map application to indicate a location, or otherwise zooms into a display map location, pans a display map location, or performs similar actions to implicitly provide location information.

Explicit location information therefore, refers to location information that the application explicitly obtains from a GPS or other similar location detection component. For example, where the user employs a map application, the application might obtain the current location from any of a variety of available location detection components, including, but not limited to those implemented within the client device. Thus, implicit location information and explicit location information may be viewed as mutually exclusive forms of location information.

Location information includes virtually any form of information useable to specify a geographic location, including a geographic region. Thus, location information includes, but is not limited to latitude/longitudes, street addresses, city names, county names, buildings, zip/postal codes, merchant names, and the like. Location information may also include, for example, "Grand City Station," "Bay Area Bridge," "Capital Hill Seattle," or similar named locations.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to LS 106, client device 101, or other computing devices.

Mobile devices 102-104 may further be configured with at least one application that is configured and arranged to obtain a CT identifier for a cell tower with which the mobile device is currently in communication with. Such CT identifier may include virtually any form of identifier that is useable to uniquely identify a cell tower. In one embodiment, the application may be configured to obtain the CT identifier and to provide the CT identifier to another computing device, such as LS 106, or the like. In one embodiment, the application may be pre-loaded within the mobile device, or may be configured to be downloaded onto the mobile device at some later time.

Mobile devices 102-104 may also be configured to include a client application that enables the end-user to log into an end-user account that may be managed by another computing device, such as LS 106. Such end-user account, for example, may be configured to enable the end-user to receive emails, send/receive IM messages, SMS messages, access selected web pages, participate in a social networking activity, perform search queries, or the like. However, participation in various social networking activities, performing search queries, or the like, may also be performed without logging into the end-user account.

Client device 101 may include virtually any computing device capable of communicating over a network to send and receive information, including social networking information, performing search queries, or the like. Client device 101 may also include and/or employ client applications such as those described above. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may Other overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may farther include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

As illustrated, wireless network 110 includes cell towers (CTs) 120-122. As used herein, the term "cell tower (CT)" refers to virtually any antenna and/or electronic communications equipment configured and arranged to enable a cellular network cell in a mobile computing network. Thus, CTs 120-122 may include a tower or other elevated structure for placement of one or more antennas and one or more transmitter/receivers, transceivers, or the like. As used herein, the terms "cell site," "mobile base station," "base station," "base transceiver station (BTS)," may be used interchangeably with the term "cell tower." Many of today's cell towers provide a cell tower identifier for use during communications with a client device. For example, during communications between a mobile device and one of CTs 120-122, the cell tower may provide its cell tower identifier to the mobile device. Moreover, CTs 120-122 may also communicate with each other. Thus, in one embodiment, CTs 120-121 may communicate with CT 122, or the like. It should be recognized that wireless network 110 may include more cell towers than illustrated, and thus, the invention should not be viewed as being constrained to that which is shown, and other configurations are also envisaged and are within the scope of the invention.

Network 105 is configured to couple content servers 112 and/or LS 106 with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content services 112, LS 106, client device 101, and other computing devices.

Additionally, communication media typically embodies computer-readable instructions, data structures, program modules, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Content services 112 represents any of a variety of network devices configured to provide content, application, and/or other services for use by one or more client devices 101-104. Such applications and services include, but are not limited to web services, third-party services, audio services, video services, email services, IM services, SMS services, VOIP services, calendaring services, photo services, or the like. In one embodiment, content services 112 may provide location based applications, as well as non-location based applications. As noted, the location based applications may include applications configured to explicitly request location information as well as those implicit location may be provided, or even a combination of explicit and implicit location information.

Devices that may operate as content services 112 include personal computers, desktop computers, multiprocessor systems, microprocessor-based or programmable consumer electronics, network PCs, servers, and the like.

One embodiment of LS 106 is described in more detail below in conjunction with FIG. 3. Briefly, however, LS 106 may include any computing device capable of connecting to network 105 to determine location information for CTs 120-122, and to provide such information to a location based application automatically and transparent to a user.

LS 106 may receive information about actions performed by at least one user of one or more of client devices 102-104 that may be related to location based activities. For example, LS 106 may be notified by content services 112 that a location based application is being requested and/or employed by a user of client devices 102-104. LS 106 may also receive from client devices 102-104 or content services 112, a CT identifier indicating with which CT 120-122, the client device is currently using to communicate over the networks (110 and 105).

In one embodiment, LS 106 may receive text, or other information that the user provided to the location based application. For example, the user might provide implicit location information to the location based application. LS 106 may parse the information, extract or otherwise determine the location information from within the parsed information, and determine that the location information implicitly indicates at least an approximate location of the client device. Such approximate location information, together with the CT identifier may be stored in a data store. LS 106 may similarly receive other location information from one or more other client devices 102-104, including additional implicit location information, as well as explicit location information, GPS location information, or the like.

LS 106 may then determine based on the implicit location information at least an approximate location of the CT associated with the CT identifier. In one embodiment, LS 106 may determine the approximate location based on taking a most often provided implicit location. That is, LS 106 may determine the most often location implicitly entered by users of client devices while connected to the CT associated the provided CT identifier, LS 106 may then associate that most often entered implicit location as the approximate location of the CT. In one embodiment, LS 106 may determine a region or coverage area for the CT. Such region or coverage area may be described by latitude/longitudes defining a boundary for the region, a name of a region, including a town, community, city, or the like. In one embodiment, LS 106 may employ explicit location information, including GPS location information, or the like, to subsequently refine the determined location of the CT.

When another mobile device subsequently requests a location based application, LS 106 may intercept the CT identifier for the CT that the other mobile device is currently connected to, lookup the approximate location of the CT, and automatically and transparent to a user of the other mobile device, provide the approximate location information to the location based application for use. By providing the location information, the user is saved the time and effort of determining their location, and providing it to the application. In one embodiment, the approximate location information may also be displayed on the user's mobile device for use in other location based applications, or the like. LS 106 may employ processes such as those described below in conjunction with FIGS. 4-5 to perform at least some of its actions.

Devices that may operate as LS 106 include various network devices, including, but not limited to personal computers, desktop computers, multiprocessor systems, microprocessor-based or programmable consumer electronics, network PCs, servers, network appliances, and the like.

Although FIG. 1 illustrates LS 106 as a single computing device, the invention is not so limited. For example, one or more functions of LS 106 may be distributed across one or more distinct computing devices. Moreover, LS 106 may be integrated with one or more components, applications, or the like, in content services 112.

Moreover, in one embodiment, one or more client devices 102-104 may also be configured to determine location information based, for example, on repeated use of location based applications by a user of the client device. In one embodiment, one or more client devices 102-104 might share their location information, implicit, explicit, and/or GPS location information with other client devices. For example, a plurality of client devices using a same CT to connect and communicate over the networks, might also share location information with each other to converge on and determine a location of the CT. In one embodiment, such arrangement may be implemented using a peer-to-peer configuration. However, the invention is not so limited and other architectures may also be employed.

Illustrative Mobile Client Environment

Figure 2:
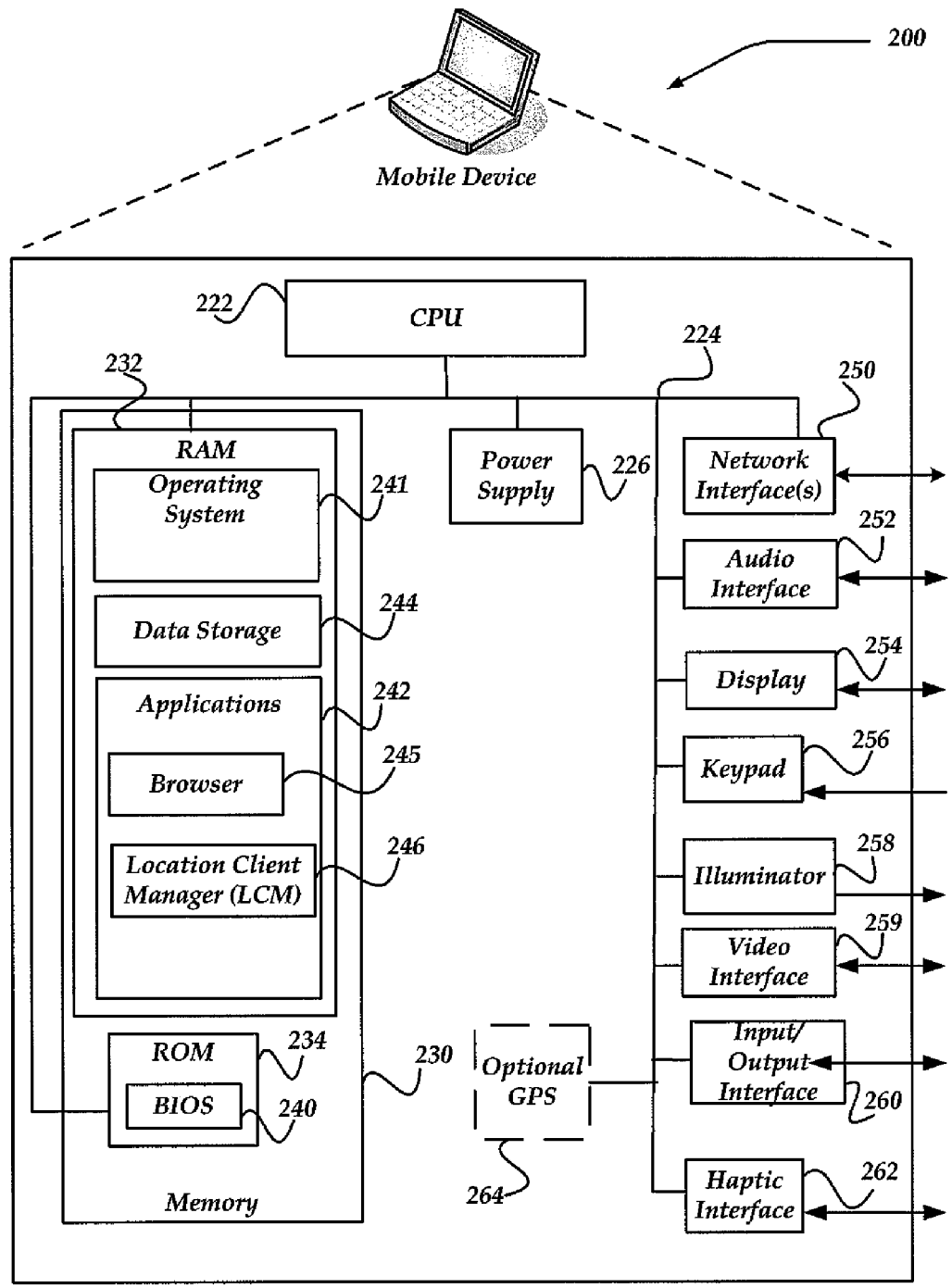
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. It should be noted that GPS receiver 264 is optional, and as such, many mobile devices might not include such a component. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store social networking information including address books, buddy lists, aliases, photographs, messages, or the like. At least a portion of the social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. For example, applications 242 may include browser 245 and location client manager (LCM) 246.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable access to a location based application, such as might be available through content services 112, or the like, of FIG. 1. In one embodiment, a user of mobile device 200 may input to the location based application a variety of text, graphics, or the like, for use in obtaining a location based result.

LCM 246 is configured and arranged to determine a CT identifier associated with a CT for which mobile device 200 is currently connected. In one embodiment, LCM 246 may request such information from networking applications that may reside within operating system 241, or the like, to obtain the CT identifier. LCM 246 may then provide the CT identifier to another computing device over a network. In one embodiment, LCM 246 may provide the CT identifier when a user of mobile device 200 launches or otherwise requests a location based application. In one embodiment, LCM 246 may intercept text, graphics, or the like, that a user enters into the location based application, and also provide such information over the network to the other computing device for which the CT identifier is also provided.

In one embodiment, LCM 246 might receive in response to sending of the CT identifier, location information that may be used to approximate a location of mobile device 200. Such location information may then be automatically, and transparent to the user of mobile device 200, provided to a location based application launched by the user, thereby eliminating a need for the user to explicitly enter such location information.

In one embodiment, LCM 246 might also be configured to operate to determine the approximate location of the CT based on information from other client devices, from several uses of location based applications by mobile device 200, or the like.

Illustrative Network Device Environment

Figure 3:
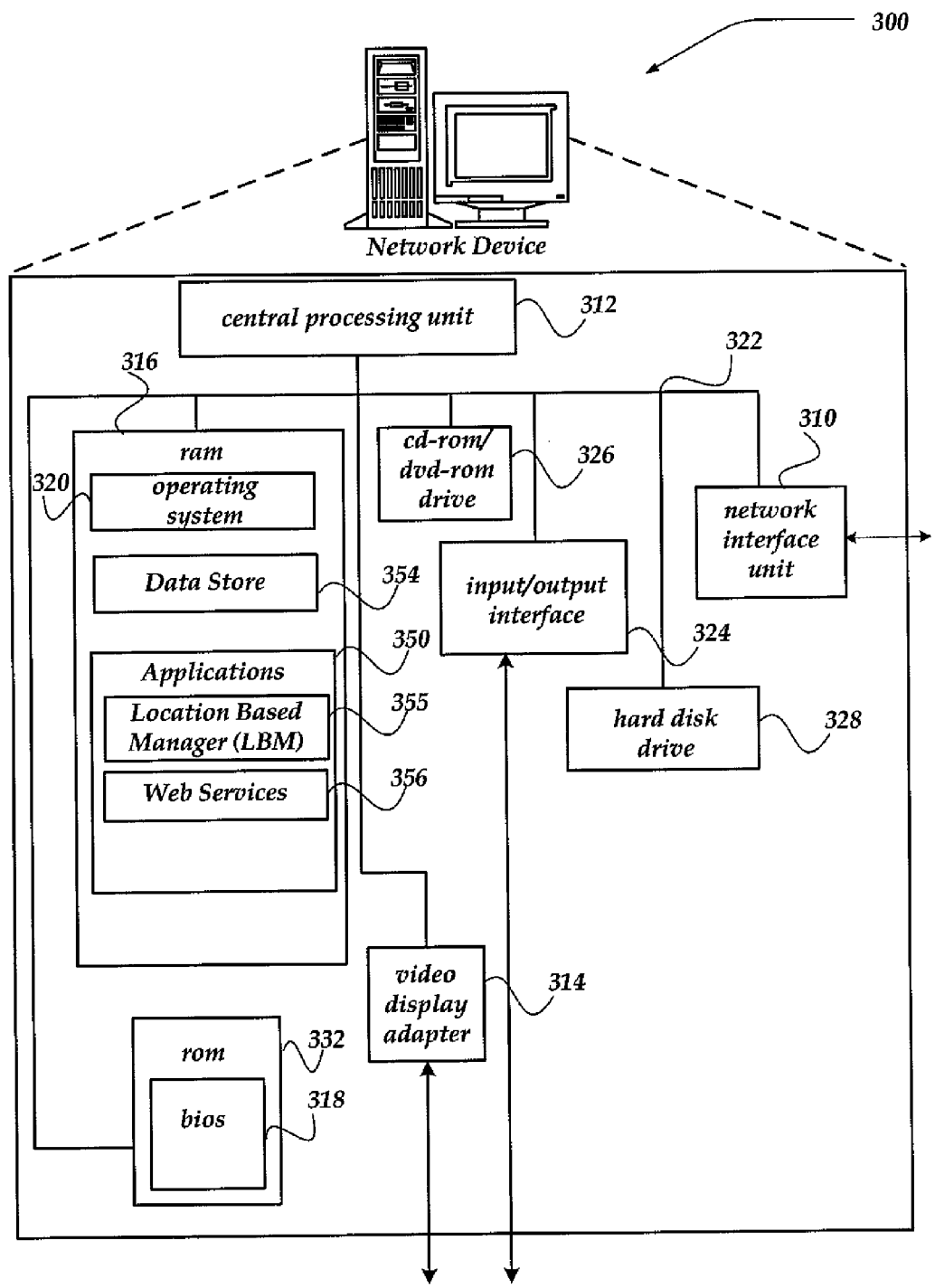
FIG. 3 shows one embodiment of a network device that may be included in a system implementing the invention.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, LS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to information about cell towers, including, but not limited to CT identifiers, implicit location information, explicit location information, GPS location information, and/or a determined approximate location and/or coverage area or region for the CT.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Locations Based Manager (LBM) 355 and web services 356.

Web services 356 represent any of a variety of services that are configured to provide content over a network to another computing device. Thus, web services 356 include for example, a web server, messaging server, a File Transfer Protocol (FTP) server, a database server, a content server, or the like. Web services 356 may provide the content over the network using any of a variety of formats, including, but not limited to WAP, HDML, WML, SMGL, HTML, XML, cHTML, xHTML, or the like. In one embodiment, web services 356 may interact with LBM 355 when a client device requests a location based application.

In one embodiment, web services 356 may be configured to provide location information to LBM 355 whenever a client device requests a location based application to be launched or otherwise accessed. Web services 356 may also be configured to receive location information from LBM 356 and provide such information automatically, and transparent to a user of the client device, to the location based application to refine and/or otherwise enhance its results displayable at the client device.

LBM 355 is configured and arranged to determine an approximate location of a cell tower (CT), using at least implicit location information obtained from a plurality of mobile devices obtained while each mobile device user employs a location based application. LBM 355 may also receive for each of the mobile devices, a CT identifier associated with a cell tower each mobile device is currently connected to. When a sufficient number of mobile devices provide implicit location information for a given CT identifier, an approximate location, coverage area, and/or the like, may be determined by LBM 355 for the CT.

Subsequently, when another mobile device provides a CT identifier for which an approximate location has been determined, the approximate location information may be used to assist the user of the mobile device. For example, the user might access a location based application and automatically, and transparent to the user, LBM 355 might provide the approximate location or the like of the CT as the approximate location of the user's mobile device. LBM 355 might provide the information to web services 356, to the location based application, and/or to the mobile device for display to the user. LBM 355 may employ processes such as described below in conjunction with FIGS. 4-5 to perform at least some of its actions.

Generalized Operation

Figure 4:
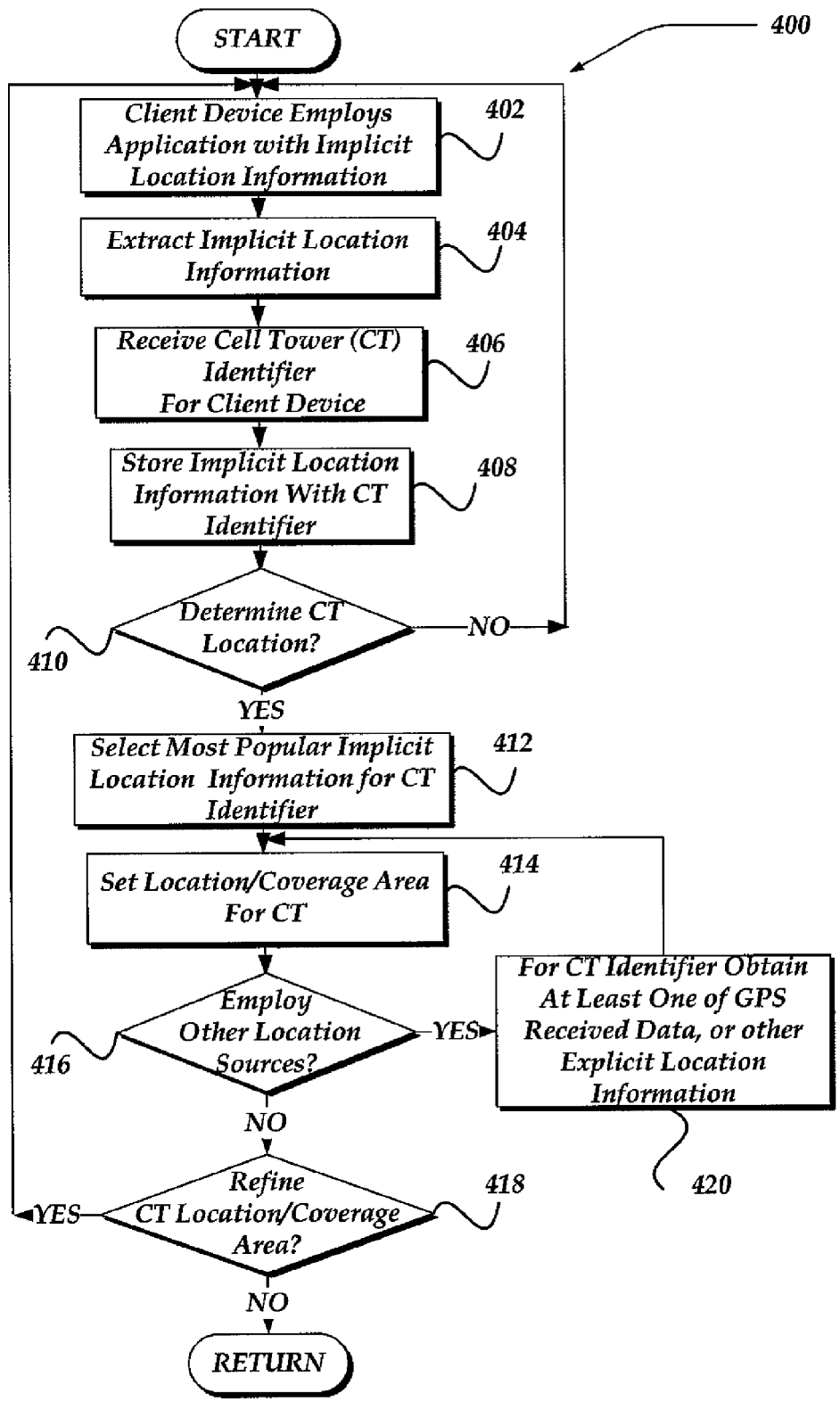
FIG. 4 illustrates a logical flow diagram generally showing one embodiment of a process for determining location/coverage area for a cell tower (CT) from a plurality of client devices.

The operation of certain aspects of the invention will now be described with respect to FIGS. 4-5. FIG. 4 illustrates a logical flow diagram generally showing one embodiment of a process for determining a location/coverage area for a cell tower (CT) from at least implicit location information obtained from a plurality of client devices during their use of location based applications. Process 400 of FIG. 4 may be implemented within LS 106, and/or content services 112 of FIG. 1. With appropriate modifications, it is apparent that process 400 may be revised to be performed by at least one mobile device, as well.

In any event, process 400 begins, after a start block, at block 402, where a client device launches or otherwise seeks access to a location based application. The location based application, may be, for example, a search application, a map application, a social networking application, or the like. For example, one such social networking application might be one that enables a user to display photographs, graphics, text, or the like, based on a location, such as where the photographs were taken, or the like. It should be noted that the invention is not limited to these example location based application, and others are also envisaged for use at block 402. In one embodiment, a user might provide while using the location based application implicit information useable to determine a location. For example, during a search application use, the user might enter location information to narrow or otherwise restrict a result of the search.

Processing then flows to block 404, where the entered information might be intercepted, or otherwise accessed and parsed to extract implicit location information. Processing continues next to block 406, where a CT identifier is also received that is associated with the CT for which the client device is currently using to communicate. It should be noted, that currently using to communicate is intended to encompass those situations where the client device is being handed-over to the CT, as well as those situations where the client device has already been handed-over, or has initiated with the CT. It should also be noted that blocks 402, 404, and 406 may be performed concurrently, or block 406 may be performed before 402 and/or 404, without departing from the scope of the invention.

Processing proceeds to block 408 where the extracted implicit information and the CT identifier may be stored in a data store. Processing continues to block 410, where a determination is made whether to determine an approximate location/coverage area for the CT for which the CT identifier is associated. The decision may be based on virtually any criteria. For example, in one embodiment, a determination may be based on having implicit location information for the CT identifier from a defined number of mobile devices. In another embodiment, the determination may be based on having implicit location information from a defined number of mobile devices, where the implicit location information between the defined number of mobile devices is consistent with each other. In one embodiment, the implicit location information obtained may be used to determine an approximate location when at least a defined number of mobile devices provide a same or approximately the same implicit location information. For example, where a most popular implicit location is identified for at least 10 or more mobile devices, such as Queen Anne, Seattle, then a determination of a location may be performed. Approximately the same implicit location information might be satisfied when a distance between the locations identified is less than some value. In any event, if a determination is to be performed, processing flows to block 412; otherwise, processing may loop back to block 402, to collect more implicit location information. Looping back also enables the location information to be obtained from more than one client device, or from the same mobile device based on different situations, perhaps at different times, or the like.

In any event, at block 412, any of a variety of mechanisms may be used to determine a location and/or coverage area for a CT associated with the CT identifier. For example, in one embodiment, a most popular implicit location may be used to identify a location/coverage area for the associated CT. Thus, in one embodiment, the location/coverage area for the CT may be determined based on an aggregate of the inputs from the plurality of mobile devices. However, other selections may also be employed, including, for example, using several closely located implicit locations to create a region, or bounded area—coverage area. The determined location is typically merely an approximate location of the CT as the implicit information typically does not provide an exact location of the cell tower.

Process 400 then flows to block 414, where the determined location/coverage area is then assigned to the CT associated with the CT identifier. Processing continues next to decision block 416, where a determination is made whether to employ additional mechanisms to refine the approximate location for the CT. If so, processing flows to block 420; otherwise, processing flows to decision block 418.

At block 420, any of a variety of other input sources may be used to refine the approximate location for the CT. For example, in one embodiment, if a client device has GPS or other location identifying mechanism, such explicit GPS (or other input) may be used to refine the location. In one embodiment, embodiment, the inputs may be provided a weighting to provide higher confidence levels on explicit or gps information over implicit information. However, it is apparent that explicit and/or gps information may not be available for a given CT. By using implicit location information, a location of a mobile device may still be approximated, absent such other information, providing a clear cost and convenience benefit. Moreover, because such implicit location information may be obtained from a plurality of client devices, a subsequent client device may benefit, even without providing implicit location information. In any event, processing then loops back to block 414.

Otherwise, processing continues to decision block 418, where a determination is made whether to continue to refine the approximate location/coverage area for a given CT. If so, processing may loop back to block 402; otherwise, processing may return to a calling process to perform other actions.

Figure 5:
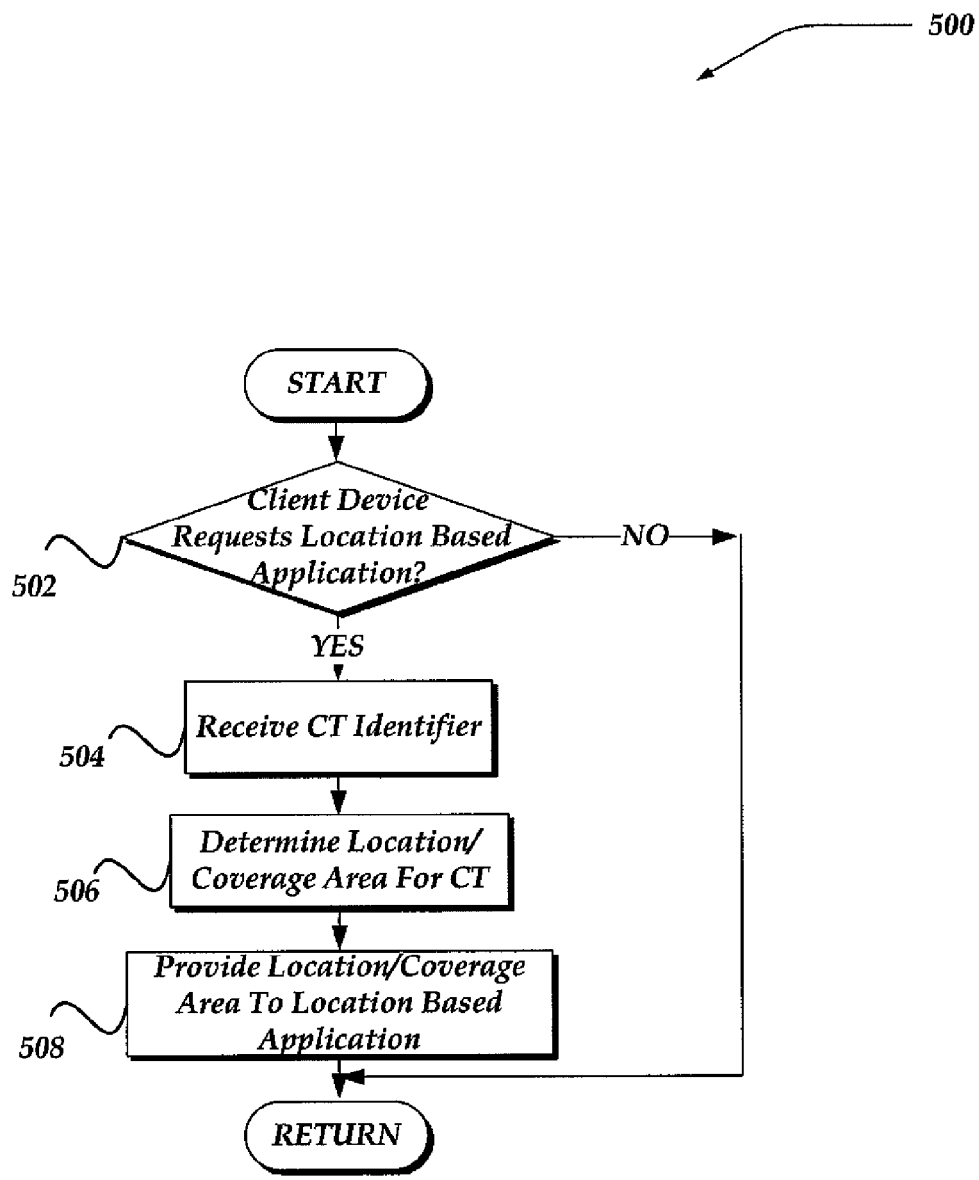
FIG. 5 illustrates a logical flow diagram generally showing one embodiment of a process for employing the determined location/coverage area of a CT used by a mobile device to provide an approximate location of the mobile device.

FIG. 5 illustrates a logical flow diagram generally showing one embodiment of a process for employing the determined location/coverage area of a CT used by a mobile device to provide an approximate location of the mobile device. Process 500 of FIG. 5 may be implemented within LS 106, and/or content services 112 of FIG. 1. With appropriate modifications, it is apparent that process 50 may be revised to be performed by at least one mobile device, as well.

Process 500 begins, after a start block, at decision block 502, where a determination is made whether a client device has launched, or otherwise seeks access to a location based application. If so, processing flows to block 504; otherwise processing returns to a calling process to perform other actions.

At block 504, a CT identifier is received for a CT for which the client device is currently using to connect to a network. Processing flows next to block 506, where the CT identifier is used to search a data store to determine whether location/coverage area information has been determined for the associated CT. If so, processing continues to block 508. Although not shown, if at block 506, it no, or an insufficient amount of location information is available in the data store for the CT, then processing might, in one embodiment, be configured to perform process 400 described above.

Otherwise, the approximate location/coverage area for the CT is obtained, and provided, at block 508, to the location based application. In one embodiment, the approximate location/coverage area information may be provided to the location based application automatically, and transparently to a user of the client device. For example, process 500 might automatically provide the location information to the application to initialize the application's display, search constraints, or the like. For example, where the location application includes a display of a map, the automatically provided location information may be provided to initialize the map display to indicate a location of the client device (based on the approximate location/coverage area being used to approximate the location of the client device.). In another embodiment, the approximate location may be provided to the client device for display, as well. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device comprising:
a non-transitory storage medium;
a processor in communication with a non-transitory storage medium and configured to execute computer instructions stored on a non-transitory storage medium, the computer instructions comprising:
  instructions for receiving from each mobile device within a plurality of mobile devices, a cell tower identifier, the cell tower identifier being identical for all mobile devices within the plurality of mobile devices;
  instructions for extracting from each of the mobile devices within the plurality of mobile devices implicit location information accessible during a use of at least one location based application by the respective mobile device, wherein the implicit location information is not explicitly requested by the at least one location based application;
  instructions for determining an approximate location for a cell tower associated with the cell tower identifier based on the implicit location information from each mobile device within the plurality of mobile devices, the determining of the approximate location for the cell tower associated with the cell tower identifier further comprises aggregating the implicit location information from each mobile device within the plurality of mobile devices for the same cell tower identifier to determine a most popular location as the location of the cell tower; and
  independent of explicit location information;
  refining the determined approximate location of the cell tower based on weighting of other location information from other sources, the other location information comprising explicit location information;
  receiving from at least one mobile device other than a mobile device included in the plurality of mobile devices, the cell tower identifier; and
  instructions for transmitting to the at least one other mobile device the refined determined cell tower location.

2. The network device of claim 1, wherein the processor is further configured to execute further computer instructions comprising:
receiving at least one of global positioning location information and explicitly entered location information by a user for the cell tower identifier; and
employing the received at least one of global positioning location information and explicitly entered location information as the other location information to refine the determined approximate location of the cell tower.

3. The network device of claim 1, wherein the implicit location information further comprises information implicitly obtained from a display cursor position within a map application.

4. The network device of claim 1, further comprising transmitting to each mobile device in the plurality of mobile devices, and to the at least one mobile device, a downloadable component to obtain and provide the cell tower identifier during wireless network communications with the cell tower associated with the cell tower identifier.

5. The network device of claim 1, wherein the cell tower location is used as the location of the at least one mobile device within the at least one location based application that is configured to provide a location based result for display at the at least one other device.

6. A system comprising:
a processor;

a non-transitory storage medium for tangibly storing thereon program logic for execution by the processor, the program logic comprising:

cell tower identifier receiving logic executed by the processor for receiving, from each mobile device within a plurality of mobile devices, a cell tower identifier, the cell tower identifier being identical for all mobile devices within the plurality of mobile devices;

extracting logic executed by the processor for extracting, from each of the mobile devices within the plurality of mobile devices, implicit location information accessible during use of at least one location based application by the respective mobile device, wherein the implicit location information is not explicitly requested by the at least one location based application;

determining logic executed by the processor for determining an approximate location for a cell tower associated with the cell tower identifier based on the implicit location information from each mobile device within the plurality of mobile devices and independent of explicit location information, the determining of the approximate location for the cell tower associated with the cell tower identifier further comprises aggregating the implicit location information from each mobile device within the plurality of mobile devices for the same cell tower identifier to determine a most popular location as the location of the cell tower;

refining logic executed by the processor for refining the determined approximate location of the cell tower based on weighting of other location information from other sources, the other location information comprising explicit location information;

receiving logic executed by the processor for receiving, from at least one mobile device other than a mobile device included in the plurality of mobile devices, the cell tower identifier; and transmitting logic executed by the processor for transmitting, to the at least one other mobile device, the refined determined cell tower location.

7. The system of claim 6, wherein the determining logic for determining, based on the implicit location information from each mobile device within the plurality of mobile devices for said tower identifier, the approximate location for the cell tower further comprises determining a geographical region in which the cell tower likely resides.

8. The system of claim 6, wherein the program logic further comprises:

global positioning location information receiving logic executed by the processor for receiving at least one of global positioning location information and explicitly entered location information by a user for the cell tower identifier; and approximate location refining logic executed by the processor for employing the received at least one of global positioning location information and explicitly entered location information as the other location information to refine the determined approximate location of the cell tower.

9. The system of claim 6, wherein the at least one location based application includes at least one of a map application, a search application, and a graphics application.

10. A non-transitory computer-readable storage medium comprising computer-executable instructions, the computer-executable instructions when installed onto a computing device enable the computing device to perform steps comprising:

receiving from each mobile device within a plurality of mobile devices, a cell tower identifier, the cell tower identifier being identical for all mobile devices within the plurality of mobile devices;

extracting from each of the mobile devices within the plurality of mobile devices implicit location information accessible during a use of at least one location based application by the respective mobile device, wherein the implicit location information is not explicitly requested by the at least one location based application and wherein the implicit location information further comprises information useable to restrict search query results entered during use of the at least one location based application for a location based search;

determining an approximate location for a cell tower associated with the cell tower identifier based on the implicit location information from each mobile device within the plurality of mobile devices and independent of explicit location information, the determining of the approximate location for the cell tower associated with the cell tower identifier further comprises aggregating the implicit location information from each mobile device within the plurality of mobile devices for the same cell tower identifier to determine a most popular location as the location of the cell tower; and refining the determined approximate location of the cell tower based on weighting of other location information from other sources, the other location information comprising explicit location information;

receiving from at least one mobile device other than a mobile device included in the plurality of mobile devices, the cell tower identifier; and providing to the at least one other mobile device the refined determined cell tower location.

11. The non-transitory computer-readable storage medium of claim 10, wherein the computer-executable instructions enable the computing device to perform further actions, including:

receiving at least one of global positioning location information and explicitly entered location information by a user for the cell tower identifier; and employing the received at least one of global positioning location information and explicitly entered location information as the other location information to refine the determined approximate geographic coverage area for the cell tower.

12. The non-transitory computer-readable storage medium of claim 10, wherein the at least one location based application used by the mobile device is selected by the user from at least one of a search application, a map application, or a social networking application.

13. The non-transitory computer-readable storage medium of claim 10, wherein the implicit location information is extracted from a search query received from the mobile device performed during the use of the at least one location based application.

14. The non-transitory computer-readable storage medium of claim 10, wherein extracting implicit location information comprises:

parsing a user entry to the at least one location based application;

identifying location information; and employing the identified location information as implicit location information.

15. A method comprising:
receiving from each mobile device within a plurality of mobile devices, a cell tower identifier, the cell tower identifier being identical for all mobile devices within the plurality of mobile devices;
extracting from each of the mobile devices within the plurality of mobile devices implicit location information accessible during a use of at least one location based application by the respective mobile device, wherein the implicit location information is not explicitly requested by the at least one location based application and wherein the implicit location information further comprises information useable to restrict search query results entered during use of the at least one location based application for a location based search;
determining an approximate location for a cell tower associated with the cell tower identifier based on the implicit location information from each mobile device within the plurality of mobile devices and independent of explicit location information, the determining of the approximate location for the cell tower associated with the cell tower identifier further comprises aggregating the implicit location information from each mobile device within the plurality of mobile devices for the same cell tower identifier to determine a most popular location as the location of the cell tower;
refining the determined approximate location of the cell tower based on weighting of other location information from other sources, the other location information comprising explicit location information;
receiving from at least one mobile device other than a mobile device included in the plurality of mobile devices, the cell tower identifier; and
providing to the at least one other mobile device the refined determined cell tower location.

16. The method of claim 15, wherein said extracting implicit location information comprises:
parsing a user entry into the at least one location based application;
extracting from the parsed user entry terms indicating a location; and
employing the extracted terms as the implicit location information.

17. The method of claim 15, wherein said refining comprises:
refining the approximate location for the cell tower associated with the cell tower identifier based on at least one of a global positioning location input received from yet another mobile device for the cell tower identifier.

* * * * *